United States Patent
Tarantino et al.

(10) Patent No.: US 10,275,701 B2
(45) Date of Patent: Apr. 30, 2019

(54) METHOD FOR PRODUCING PORTABLE DATA CARRIERS

(75) Inventors: Thomas Tarantino, Laufen (DE); Thomas Gotz, Markt Schwaben (DE); Marc Elsasser, Munich (DE); Robert Griesmeier, Heufeldmuhle (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 373 days.

(21) Appl. No.: 13/322,634

(22) PCT Filed: May 28, 2010 (Under 37 CFR 1.47)

(86) PCT No.: PCT/EP2010/057480
§ 371 (c)(1), (2), (4) Date: Nov. 28, 2011

(87) PCT Pub. No.: WO2010/136590
PCT Pub. Date: Dec. 2, 2010

(65) Prior Publication Data
US 2012/0066893 A1  Mar. 22, 2012

(30) Foreign Application Priority Data
May 29, 2009 (DE) .................. 10 2009 023 405

(51) Int. Cl.
*G06K 19/077* (2006.01)

(52) U.S. Cl.
CPC . *G06K 19/07743* (2013.01); *G06K 19/07718* (2013.01); *Y10T 29/49002* (2015.01); *Y10T 29/5313* (2015.01)

(58) Field of Classification Search
CPC ....... G06K 19/07718; G06K 19/07743; G06K 19/07745; G06K 19/07722
See application file for complete search history.

(56) References Cited

U.S. PATENT DOCUMENTS 4,549,247 A * 10/1985 Hoppe ............. G06K 19/07743
174/528
4,788,102 A * 11/1988 Koning ............ G06K 19/07718
283/904

(Continued)

FOREIGN PATENT DOCUMENTS

DE    196 14 808 A1   10/1996
DE    19602821        6/1997
(Continued)

OTHER PUBLICATIONS

Machine Translation of JP10264561A, obtained Jan. 26, 2015.*
(Continued)

*Primary Examiner* — Livius Radu Cazan
(74) *Attorney, Agent, or Firm* — Workman Nydegger

(57) ABSTRACT

The invention relates to a method for producing portable data carriers (10, 11), wherein first there are provided a module carrier band (20), on which are arranged chip modules (26) with contact surfaces (21) arranged on one side of the module carrier band (20), and at least one substrate foil (31, 32, 33), respectively as rolled goods. The module carrier band (20) and the at least one substrate foil (31, 32, 33) are unrolled from the respective roll (51, 52, 53) and continuously brought together. Then, the module carrier band (20) is permanently connected with the at least one substrate foil (31, 32, 33) in such a way that the contact surfaces (21) of the chip modules (26) point outward. From the composite (40) there can be detached in particular portable data carriers in the format ID-000 (10) or mini-UICC (11).

18 Claims, 3 Drawing Sheets

(56) References Cited

U.S. PATENT DOCUMENTS

| | | | |
|---|---|---|---|
| 4,863,546 A | 9/1989 | Melzer et al. | |
| 4,897,534 A * | 1/1990 | Haghiri-Tehrani | G06K 19/07718 235/488 |
| 5,888,624 A * | 3/1999 | Haghiri | G06K 19/077 235/488 |
| 6,305,609 B1 * | 10/2001 | Melzer et al. | 235/487 |
| 6,437,985 B1 | 8/2002 | Blanc et al. | |
| 6,607,135 B1 * | 8/2003 | Hirai | G06K 19/07718 235/487 |
| 7,141,451 B2 | 11/2006 | Tsunoda et al. | |
| 2003/0064544 A1 | 4/2003 | Heinemann et al. | |
| 2005/0035491 A1 * | 2/2005 | Bagnall et al. | 264/272.11 |
| 2011/0042830 A1 | 2/2011 | Tarantino | |
| 2011/0101105 A1 | 5/2011 | (Schropf) Grundwurmer et al. | |

FOREIGN PATENT DOCUMENTS

| | | |
|---|---|---|
| DE | 19614808 | 10/1997 |
| DE | 698 06 515 T2 | 9/1998 |
| DE | 10016715 | 9/2001 |
| DE | 60121974 T2 | 2/2006 |
| DE | 102004028218 | 5/2006 |
| DE | 60 2004 007 861 T2 | 4/2008 |
| DE | 10 2008 005 320 A1 | 7/2009 |
| DE | 10 2008 019 571 A1 | 10/2009 |
| EP | 0 134 820 B1 | 7/1983 |
| EP | 0706152 | 10/1995 |
| JP | 10264561 A * | 10/1998 |
| WO | 01/75788 A1 | 10/2001 |
| WO | 2009127395 | 10/2009 |

OTHER PUBLICATIONS

International Search Report in PCT/EP2010/057480, dated Aug. 11, 2010.

German Search Report issued in related German application 10 2009 023 405.5, dated Apr. 28, 2010.

* cited by examiner

METHOD FOR PRODUCING PORTABLE DATA CARRIERS

BACKGROUND OF THE INVENTION

1. Field of the Invention

The present invention relates to a method for producing portable data carriers, in particular in the format ID-000 or mini-UICC, and an apparatus for producing such portable data carriers. In the case of SIM cards for mobile phones, data carriers in ID-000 format are also referred to as plug-in SIM cards.

2. Related Art

To produce portable data carriers in small formats, such as ID-000 according to ISO 7810 or mini-UICC, usually there are first produced data carriers in a larger format, in particular ID-1 format according to ISO 7810. The data carrier in ID-1 format is provided with a perforation, whereby merely narrow connecting bridges remain, so that along this perforation the data carrier of the smaller format can be detached. Detaching the small-format data carrier is usually effected directly by the end-consumer, before he for example inserts the SIM card into a mobile phone. This procedure has the advantage that for producing the small-format data carriers the conventional, already known production machines for producing the large data carriers can be used. But this procedure has the disadvantage that the residue of the larger data carrier, which remains after the detachment of the small-format data carrier, has no other function and is disposed. Due to the higher material consumption, undesirable material costs arise upon the production of the portable data carriers, and waste is produced which in view of modern environmental awareness should be kept low.

There are known methods for producing portable data carriers in ID-1 format, in which various layers of the data carrier are provided in the form of substrate foils, usually plastic foils, as rolled goods. The various substrate foils are unrolled from the respective roll, brought together and then laminated for example by using adhesive and/or heat. From the resulting composite later there are detached the card bodies in ID-1 format which include the small-format, detachable data carriers. In the laminated card bodies there is formed a cavity in which a chip module is implanted, in order to substantially finish the small-format data carrier. For this purpose, the chip modules are provided on a module carrier band on a roll, are detached from this and implanted in the cavity, for example punched out and inserted by machine. Forming the cavity in the card body and implanting the chip module in the cavity requires several processing steps and is therefore relatively elaborate.

A module carrier band with chip modules arranged thereon is described for example in DE 196 40 304 C2. On one side of the carrier band, which for example may consist of an electrically insulating epoxy resin, the contact surfaces of the chip modules are arranged. On the other side of the carrier band, there are arranged the semiconductor circuits (chips) electrically connected with said contact surfaces through the carrier band. For protecting the chips and the electrical connections, the chips are individually surrounded with potting compound.

A method for producing portable data carriers with very small dimensions is described for example in DE 10 2004 028 218 B4. Here, however, the chip modules are not detached from a module carrier band and incorporated in a cavity of a card body. Instead, the production of the portable data carrier is effected by injection molding process, wherein on both sides of the module carrier band parts of the injection mold are arranged and in this way the chip module is integrated in the data carrier directly during the injection molding. However, this method is relatively expensive.

SUMMARY OF THE INVENTION

It is therefore the object of the present invention to propose a method for producing portable data carriers, in particular in small formats such as ID-000 or mini-UICC, which allows a simple, quick and accordingly cost-effective production of such portable data carriers.

This object is achieved by a method and an apparatus having the features of the independent claims. Developments and advantageous embodiments of the invention are stated in claims dependent thereon.

In the method according to the invention, a module carrier band and at least one substrate foil are provided as rolled goods. After the unrolling and continuously bringing together of the respective rolls, the module carrier band is permanently connected with the substrate foil in such a way that the contact surfaces of the chip modules arranged on the module carrier band point outward. The module carrier band itself thus becomes component of the layer composite, from which the individual data carriers will be detached later, for this purpose the module carrier band and the at least one substrate foil being arranged to each other such that the contact surfaces of the chip modules are not covered by the substrate foil.

This method makes possible a simple production of portable data carriers, since both the substrate foil as well as the module carrier band are provided as rolled goods and are permanently connected with each other. This eliminates the implanting of chip modules, which were detached from the module carrier band before, in the substrate and there will remain little module carrier band as waste. With the method according to the invention, furthermore, the production of portable data carriers can be carried out with a high processing speed.

Preferably, the portable data carriers are detached from the composite in such a way that the contact surfaces form more than one-third of a surface of a respective one of the portable data carriers. This is in particular the case with small-format data carriers for example in the format ID-000 according to ISO 7810 or mini-UICC. With such small-format portable data carriers, a large part of that surface on which the contact surfaces are arranged is formed by the contact surfaces themselves, which results in low material consumption and thus low costs. Due to the small space requirement, such small-format portable data carriers are used in particular for mobile telecommunication terminals.

Advantageously, the chip modules are arranged on the module carrier band in distances from each other, which correspond to the width and/or length dimensions of portable data carriers in the format ID-000 or mini-UICC. In this way, after the connecting of the module carrier band with the substrate foil, on the resulting composite the portable data carriers are arranged directly adjacent to each other. Therefore, a cost-efficient production of small-format data carriers in ID-000 or mini-UICC format can be achieved, since through both the utilization of the surface area of the module carrier band as well as the utilization of the surface area of the substrate foil there is produced very little waste material and in particular there is not required any additional material to produce larger data carriers for example in ID-1 format from which the small-format data carriers had to be detached.

In a first variant of the method, the module carrier band and the at least one substrate foil, after the connecting, are wound as a composite onto a roll. From this composite, in a later stage of the process, can then be detached, for example punched out, portable data carriers which respectively have at least one chip module. Such a method is also referred to as roll-to-roll method and allows a high processing speed.

In a second variant of the method, from the composite comprising the module carrier band and the at least one substrate foil there are detached portable data carriers in such a way that each portable data carrier has at least one chip module. This method, in which the portable data carriers after the connecting are detached, for example punched out, from the composite without the composite first being wound onto a roll, is also referred to as a roll-to-card method.

Advantageously, the at least one substrate foil comprises at least two foils to be arranged one above the other. That foil which is connected directly with the module carrier band may have gaps in which are arranged parts of the chip modules protruding from the module carrier band. The protruding parts can be for example the chips of the chip modules, which are arranged on that side of the module carrier band which is connected with the substrate foil. By arranging the parts protruding from the module carrier band, for example the chips, in the gaps, connecting the module carrier band with the at least one substrate foil is further simplified.

Preferably, connecting the module carrier band with the at least one substrate foil is effected by means of adhesive. The adhesive can be applied either on only one respective surface to be connected or on both meeting surfaces. Here, the adhesive for example can be applied by means of rollers or be sprayed.

Connecting the module carrier band with the at least one substrate foil is advantageously effected using pressing rollers. After unrolling and bringing together the module carrier band and the at least one substrate foil, these are led for example between several pressing rollers and connected to each other by pressure. The pressing rollers can be additionally heated here, in order to support connecting. If a heat-activated adhesive system is used, this can be activated for example by heatable pressing rollers during connecting.

According to a first preferred embodiment of the method, the substrate foil is thicker than the module carrier band, whereby before bringing together the module carrier band and the substrate foil, a depression for receiving the module carrier band is formed in a surface on which the module carrier band is connected with the substrate foil. By reducing the thickness of the substrate foil in this area, there can be avoided a step, which would emerge when a comparatively narrow module carrier band would be used and applied onto the substrate foil without depression or gap. With the help of this procedure a flush surface of the portable data carrier is achieved. It can further be useful to provide gaps in the area of the depression for receiving the parts protruding from the module carrier band.

In a second preferred embodiment of the method, the at least one substrate foil comprises at least two foils. One of these foils has substantially the same thickness as the module carrier band and is arranged in a plane adjacent to the module carrier band. The other foil is planarly connected with both the module carrier band as well as the foil adjacent to the module carrier band. This can also prevent a possibly emerging step, which would be formed through the thickness of a comparatively narrow module carrier band.

An advantageous embodiment of the method is that there is formed a connection of the module carrier band with the one foil, which has substantially the same thickness as the module carrier band and is arranged in a plane adjacent to the module carrier band, by a heated roller running over that place at which the module carrier band and the one foil are adjacent to each other. This heated roller heats the module carrier band and the one foil and melts together and thus connects the module carrier band and the one foil with each other.

In an advantageous embodiment of the method, before the bringing together step, the at least one substrate foil is optically designed, in particular printed. The positions of the portable data carriers to be detached later are taken into account here. The optical design can be effected by applying logos, writings, graphics, colors, etc. Besides the printing, for example by pad printing, inkjet, other processing methods such as laser marking are also conceivable.

Advantageously, after connecting the module carrier band with the at least one substrate foil, there is effected an optical and/or electronic, in particular an optically checkable and/or electronically checkable personalization of the portable data carriers to be detached from the composite. By the personalization before the portable data carriers are detached from the composite, the method is simplified in particular for small-format portable data carriers, since the portable data carriers do not need to be handled individually.

The method according to the invention for producing small-format portable data carriers can be carried out by an apparatus which comprises a receptacle for a module carrier band roll and at least one receptacle for at least one substrate foil roll. The apparatus further has a device for unrolling and continuously bringing together the module carrier band and the at least one substrate foil as well as a device for permanently connecting the module carrier band with the at least one substrate foil. Furthermore, the apparatus has a device for detaching portable data carriers in the format ID-000 or mini-UCC from the composite comprising the module carrier band and the substrate foil connected therewith.

DESCRIPTION OF THE DRAWINGS

The invention is described in the following by way of example with reference to the accompanying Figures.

DETAILED DESCRIPTION OF PREFERRED EMBODIMENTS OF THE INVENTION

Figure 1:
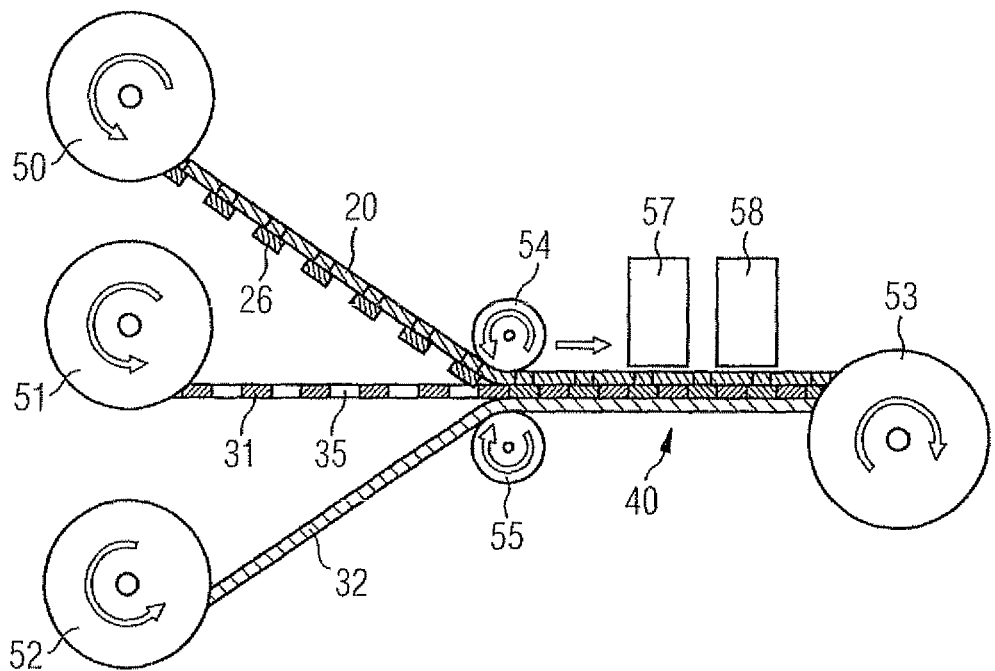
FIG. 1 schematically shows an apparatus for producing portable data carriers in the roll-to-roll method, FIG. 2 schematically shows an apparatus for producing portable data carriers in the roll-to-card method.

In FIG. 1 there is represented in a highly schematic manner an apparatus for producing portable data carriers from a module carrier band 20 and a substrate foil in the roll-to-roll method, the substrate foil here consisting of two foils 31, 32, for example plastic foils. Upon the production of the composite 40 in the roll-to-roll method, the individual layers 20, 31, 32 of the composite 40 are provided on rolls 50, 51, 52 and the composite 40 again is, wound onto a roll 53.

The module carrier band 20, which carries the chip modules 26, is unrolled from the roll 50. Furthermore, from the rolls 51, 52 the plastic foil webs 31, 32 are unrolled. The plastic foil 31 has a thickness which corresponds to the height of the chips or of the potting compound. Moreover, the plastic foil 31 has gaps 35, in which the chips protruding from the module carrier band 20 are incorporated. The plastic foil 32, however, is formed continuously and has no gaps. It forms that side of the data carrier which faces away from the contact surfaces of the chip modules 26. The plastic foils 31, 32 may have been, for example, previously printed. Also before the winding onto the roll 53, the composite 40 can be printed by means of a printing device 57. Printing the composite 40 or the foils 31, 32 before the connecting can be effected for example by pad printing.

The layers 20, 31, 32 are brought together between pressing rollers 54, 55 and are permanently connected with each other. The pressing rollers 54, 55 can be heated in order to activate a heat-activated adhesive system applied for example by means of rollers onto the module carrier band 20 and/or the foils 31, 32, or in order to laminate the foils 20, 31, 32 with each other solely by pressure and heat, whereby the adhesive system may be a heat-activated adhesive foil. The resulting composite 40 is then wound onto the roll 53. Before that, an electronic and/or optical personalization by means of a personalization device 58 can be carried out. The personalization, however, can also be effected in a separate machine which further processes the composite 40 wound onto the roll 53.

Figure 2:
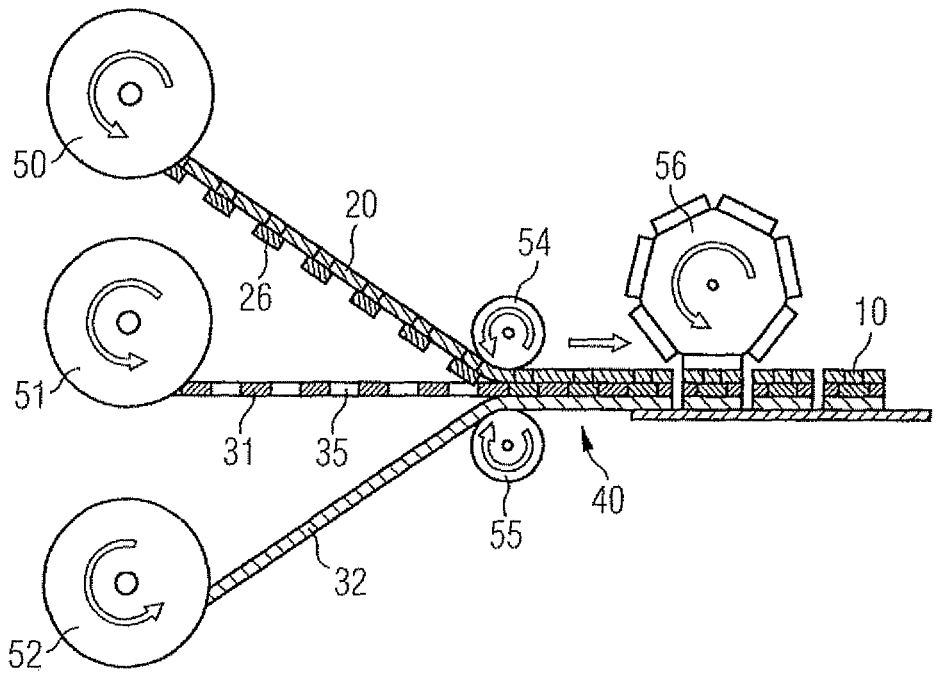

In contrast to the apparatus shown in FIG. 1, the apparatus for producing portable data carriers shown in FIG. 2—also strongly schematized—is set up in the roll-to-card method. Here, the module carrier band 20 and the foils 31, 32 are also provided as rolled goods, but after the connecting of the individual layers 20, 31, 32 the portable data carriers are detached from the composite 40 without a subsequent winding. The detaching can be effected for example by means of a rotary punching machine 56, which punches out individual data carriers 10 by rotation from the composite 40 during the transport of the composite 40. Likewise, a printing device 57 and a personalization device 58 can be provided for example in transport direction before the rotary punching machine 56.

Preferably, the data carriers 10 are detached from the composite 40 in such a way that there remains almost no residue of the composite 40 as waste. In the roll-to-card method, only possibly remaining residues of the composite 40 are wound onto a roll. Such residues can be for example a grid which is left after the data carriers 10 have been detached. It is also possible that only at the edges of the composite 40 a narrow strip remains after the data carriers 10 have been detached, whereas the data carriers 10, in transport direction of the composite 40, directly adjoin each other and are detached without residue. To increase the stability of the data carrier upon the transport during the production, the edge can also be detached only at the very end of the production.

Figure 3:
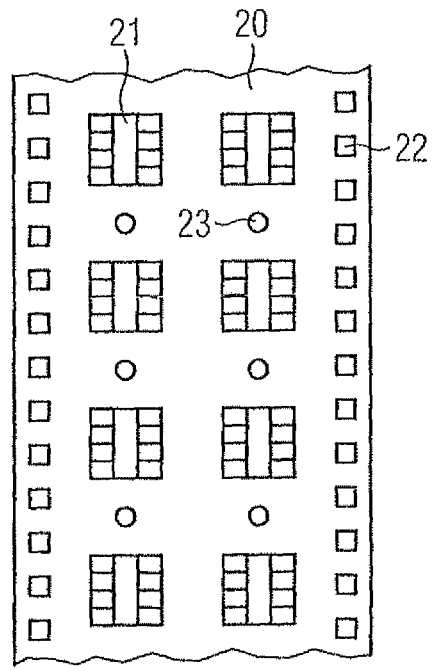
FIG. 3 shows a module carrier band in a plan view.

For producing the portable data carrier 10, a module carrier band 20 is used which is represented in FIG. 3. The module carrier band 20 can be for example a band made of electrically insulating epoxy resin, for example FR4 or PI. To make possible a safe and precise transport of the module carrier band 20 during the production process, the module carrier band 20 has transport holes 22. Alternatively or additionally, transport holes 23 can also be arranged between the contact surfaces 21. Where appropriate, one can also do without the transport holes 22, 23, in this case the exact transport can be ensured by reference marks on the module carrier band 20. The module carrier band 20 has at least one row of chip modules 26 with the respectively associated contact surfaces 21.

On the shown surface of the module carrier band 20 there are arranged ISO contact surfaces 21. On the not-shown back of the module carrier band 20 there are located the chips which are electrically connected through the module carrier band 20 with the contact surfaces 21. If the chips are connected with the contact surfaces 21 by means of bonding wires 21, for protection these are surrounded with potting compound (Globtop). But there can also be used so-called FlipChips, which are connected to through-connections directly on their side facing the contact surfaces 21. Preferably, the contact surfaces 21 are arranged on the module carrier band 20 corresponding to the length and/or width dimensions of the small-format data carriers 10 to be produced, so that almost no residual material remains upon the production of the data carrier 10.

Figure 4:
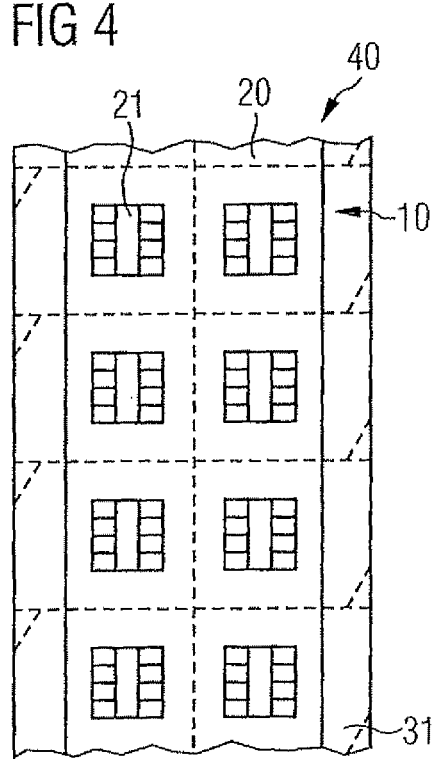
FIG. 4 shows in a plan view a module carrier band connected with a substrate foil.

In FIG. 4, there is shown a composite 40 of the module carrier band 20 and a substrate foil 31. Before the production of the composite 40 the edges with the transport holes 22 of the module carrier band 20 were detached. The substrate foil 31, for example a plastic foil web, for producing plug-in SIM cards 10 in the ID-000 format, each of which are 25 mm long, may have a width of 50 mm, when the two-row module carrier band 20 shown in FIG. 3 is used. With a corresponding arrangement of the contact surfaces 21, thus, the SIM cards 10, which are to be detached later, can be arranged directly adjacent to each other on the composite 40, in order to utilize the material particularly efficient. An exemplary arrangement of the SIM cards 10 in ID-000 format on the composite 40 is indicated in FIG. 4 by dashed lines.

Alternatively, the method can also be carried out with a single-row module carrier band and a correspondingly narrower substrate foil. It is also conceivable to use a broader substrate foil, onto which are applied several single-row or multi-row module carrier bands in parallel side-by-side. The module carrier bands can then be arranged in distances which correspond to the dimensions of the data carriers to be produced, in the case of data carriers in ID-000 format for example 25 mm-distances on a 310 mm-wide perforated foil.

Figure 5:
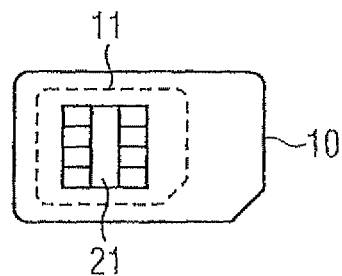
FIG. 5 shows a portable data carrier in ID-000 format.

In FIG. 5, there is shown a portable data carrier 10 in ID-000 format with contact surfaces 21, which data carrier was detached for example from the composite 40 shown in FIG. 4. Since the contact surfaces 21 in the small-format data carrier 10 occupy a comparatively very much larger portion of the surface of the data carrier than in the case of a data carrier in the ID-1 format, a lot of material can be saved, when to the end-consumer only the plug-in SIM 10 in the ID-000 format is issued. Around the contact surfaces there are indicated the outlines of a data carrier 11 in mini-UICC format, in which the contact surfaces form an even larger portion of the surface than in the data carrier 10 in ID-000 format.

Figure 6:
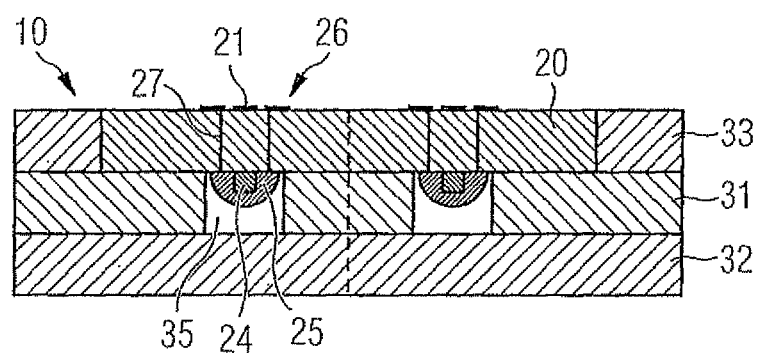
FIG. 6 shows a cross-section through a first example of a composite of a module carrier band and a substrate foil.
Figure 7:
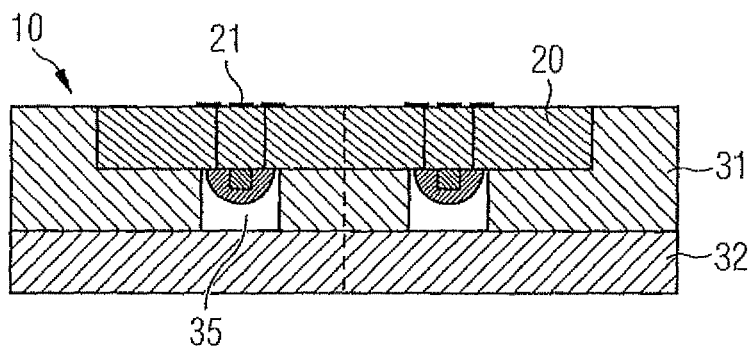
FIG. 7 shows a cross-section through a second example of a composite of a module carrier band and a substrate foil.

In the FIGS. 6 and 7, there are shown cross-sections through two different examples of a foil composite 40. The centrally arranged dashed line indicates the boundary of two directly adjacent data carriers 10, as this can be seen for example in FIG. 4. The back of the data carrier 10 is formed by the continuous foil 32. Thereon, the foil 31 is arranged, which has gaps 35 for receiving the chips 24 and the potting compound 25 surrounding the chips 24. The chips 24 as well as the contact surfaces 21 connected via through-connections 27 respectively are component of one of the chip modules 26, which are arranged on the module carrier band 20 in the manner described above.

As can be recognized in FIGS. 6 and 7, the module carrier band 20 is narrower than the substrate foil formed by the foils 31, 32. By applying the comparatively narrower module carrier band 20 onto the substrate foil, there emerges a step caused by the thickness of the module carrier band 20.

In the composite 40 shown in FIG. 6, there is thus arranged, adjacent to the module carrier band 20, a foil 33 on the foil 31, which has the same thickness as the module carrier band 20. The foil 33 is adapted in its width in such a way that it completes the narrow module carrier band 33 to the edge of the foils 31, 32. Thus, a flush surface of the data carriers 10 is produced.

In the composite 40 shown in FIG. 7, the foil 31 is substantially thicker than the module carrier band 20. In the surface of the foil 31 onto which the module carrier band 20 is applied, there was formed, for example by means of a heated embossing roller, before the connecting of the layers 20, 31, a depression for receiving the module carrier band 20. The depth of the depression corresponds to the thickness of the module carrier band 20, so that in this way, too, a flush surface of the data carriers 10 is achieved. For receiving the chips 24 and the potting compounds 25, the foil 31 again has gaps 35.

In a variant of the method, the chip modules 26 are punched out from the module carrier band 20 before the layers are brought together. Then, into the foils 31 and 33 there are punched openings of such a size and position, that later the chip module 26 can be inserted and mounted in the openings. Subsequently, first the foils 32 and 33 are applied onto the foil 31 in such a way that the foil 31 is located between the foils 32 and 33 and the openings of the foils 31 and 33 he one above the other in such a way that a chip module 26 can be inserted and mounted in the respective opening. After that, a chip module 26 is inserted and mounted in the respective opening. In this variant, the foils 31, 32 and 33 each have the same width.

In a different variant of the method, a module carrier band 20 is applied and mounted directly on a composite of at least one substrate foil 31, 32 which has gaps 35 for receiving the chips 24 and the potting compound 25 surrounding chips 24. A step will emerge here, but with thin module bands this is feasible. The total thickness of the composite of at least one substrate foil 31, 32 here corresponds to the card thickness according to the relevant standards. The thickness of the module band here must be, according to the relevant standards, less than 100 micrometers.

In a different variant of the method, the module carrier band 20 and the substrate foil 33 arranged in a plane with the module carrier band 20 have recesses and protrusions which are arranged alternately opposing each other. This has the advantage that upon the production the protrusions of the module carrier band 20 engage in the recesses of the substrate foil 33 and vice versa the protrusions of the substrate foil 33 engage in the recesses of the module carrier band 20 and thus make possible a very simple and effective positioning of module carrier band 20 and substrate foil 33 to each other according to the zip merging principle.

It holds in general that all of the above-mentioned foils, such as e.g. the foils 31, 32, 33 or the module carrier band 20 consist of at least one layer. The respective layer consists of any suitable material, such as e.g. plastic material, whereby in the case of several layers, the layers may consist of the same material or of different materials.

The invention claimed is:

1. A method for producing portable data carriers, the method comprising the steps:

providing a first rolled good that includes a module carrier band with a plurality of chip modules being arranged thereon, wherein each of the plurality of chip modules within the first rolled good includes a chip and contact surfaces electrically coupled to the chip, each of the chips being provided on a first surface of the module carrier band and the corresponding contact surfaces of the plurality of chip modules are provided on a second surface of the module carrier band, the first surface of the module carrier band being opposite from the second surface of the module carrier band and the module carrier band being provided between the plurality of chip modules and the contact surfaces of the plurality of chip modules;

providing at least one substrate foil that includes a first foil and at least a second foil, the at least one substrate foil being provided at least by providing a second rolled good that includes the first foil having gaps formed therein and further having a thickness that accommodates a height of the chips arranged on the first surface of the module carrier band, and providing a third rolled good that includes at least the second foil;

unrolling the first rolled good with the module carrier band and the plurality of chip modules arranged thereon;

unrolling the second rolled good with the first foil;

unrolling the third rolled good with the second foil;

after unrolling the first rolled good, the second rolled good, and third rolled good, bringing together the module carrier band with the plurality of chip modules arranged thereon, the first foil having the gaps formed therein, and the second foil such that each of the chips provided on the first surface of the module carrier band are each incorporated into a corresponding gap of the first foil and a surface of the chip modules opposite from the module carrier band is covered by the second foil; and permanently connecting the first surface of the module carrier band to the at least one substrate foil such that the contact surfaces of the chip modules arranged on the second surface of the module carrier band are on an opposite side of the module carrier band from the at least one substrate foil.

2. The method according to claim 1, including arranging the chip modules on the module carrier band at distances from each other which correspond to the width and/or length dimensions of portable data carriers in the format ID-000 or mini-UICC.

3. The method according to claim 1, including winding on a roll as a composite the module carrier band and the at least one substrate foil after the step of permanently connecting to facilitate in a later process stage detaching of portable data carriers which respectively include at least one chip module.

4. The method according to claim 1, including detaching from a composite comprising the module carrier band and the at least one substrate foil the portable data carriers in such a way that each portable data carrier comprises at least one chip module.

5. The method according to claim 1, including detaching the portable data carriers from a composite comprising the module carrier band and the at least one substrate foil in such a way that the contact surfaces form more than one-third of a surface of a respective one of the portable data carriers.

6. The method according to claim 1, including detaching the portable data carriers from a composite comprising the module carrier band and the at least one substrate foil, the portable data carriers being detached in the format ID-000 (10) or mini-UICC.

7. The method according to claim 1, wherein the first foil having the gaps formed therein and the second foil are brought together and combined to form a two-layer substrate before the first foil having the gaps formed therein and the second foil are brought together with the module carrier band with the plurality of chip modules arranged thereon.

8. The method according to claim 1, including effecting the connecting of the module carrier band with the at least one substrate foil by using pressing rollers.

9. The method according to claim 8, wherein the pressing rollers are heated.

10. The method according to claim 1, including connecting the module carrier band with the at least one substrate foil either directly or by using an adhesive.

11. The method according to claim 1, wherein
the first foil having gaps is thicker than the module carrier band, and
before bringing together the module carrier band and the first foil having gaps, a depression is formed for receiving the module carrier band in a surface of the first foil having gaps.

12. The method according to claim 1, wherein
providing the at least one substrate foil further includes providing a third foil,
the third foil has substantially the same thickness as the module carrier band, and
the method further includes arranging the third foil in a plane of the module carrier band and the first foil and the second foil are planarly connected with the module carrier band such that the third foil is adjacent to the module carrier band.

13. The method according to claim 1, including, before the bringing together step, the at least one substrate foil is optically designed.

14. The method according to claim 1, wherein, after the step of connecting the module carrier band with the at least one substrate foil, there is effected an optically checkable and/or electronically checkable personalization of the portable data carriers to be detached from a composite comprising the module carrier band and the at least one substrate foil.

15. An apparatus for producing portable data carriers, the apparatus comprising:
a receptacle containing a first rolled good,
the first rolled good including a module carrier band with a plurality of chip modules being arranged thereon, wherein each of the plurality of chip modules within the first rolled good includes a chip and contact surfaces electrically coupled to the chip, each of the chips being provided on a first surface of the module carrier band and the corresponding contact surfaces of the plurality of chip modules are provided on a second surface of the module carrier band, the first surface of the module carrier band being opposite from the second surface of the module carrier band and the module carrier band being provided between the plurality of chip modules and the contact surfaces of the plurality of chip modules;
at least one or more further receptacles containing components of at least one substrate foil as at least a second rolled good and a third rolled good,
the second rolled good including a first foil having gaps formed therein and having a thickness that accommodates a height of the chips arranged on the first surface of the module carrier band, and
the third rolled good that includes at least a second foil;
a system that unrolls the first rolled good, the second rolled good, and the third rolled good and brings together the module carrier band with the plurality of chip modules arranged thereon, the first foil having the gaps formed therein, and the second foil such that each of the chips provided on the first surface of the module carrier band are each incorporated into a corresponding gap of the first foil and a surface of the chip modules opposite from the module carrier band is covered by the second foil; and
a device that permanently connects the module carrier band with the at least one substrate foil such that the contact surfaces of the chip modules arranged on the second surface of the module carrier band are on an opposite side of the module carrier band from the at least one substrate foil; and
a device that detaches the portable data carriers in the format ID-000 or mini-UICC from a composite comprising the module carrier band and the at least one substrate foil.

16. The method according to claim 1, characterized in that
the module carrier band is permanently connected with the at least one substrate foil to form a composite,
wherein from the composite comprising the module carrier band and the at least one substrate foil there are detached portable data carriers in such a way that each portable data carrier has at least one chip module.

17. The method according to claim 1, wherein the at least one substrate foil includes a plastic foil.

18. The method according to claim 1, wherein the at least one substrate foil forms a body of the portable data carriers.

* * * * *